Aug. 28, 1951      A. L. FOLEY      2,565,553
THREE DIMENSION PICTURE DEVICE
Filed Nov. 10, 1948      3 Sheets-Sheet 1
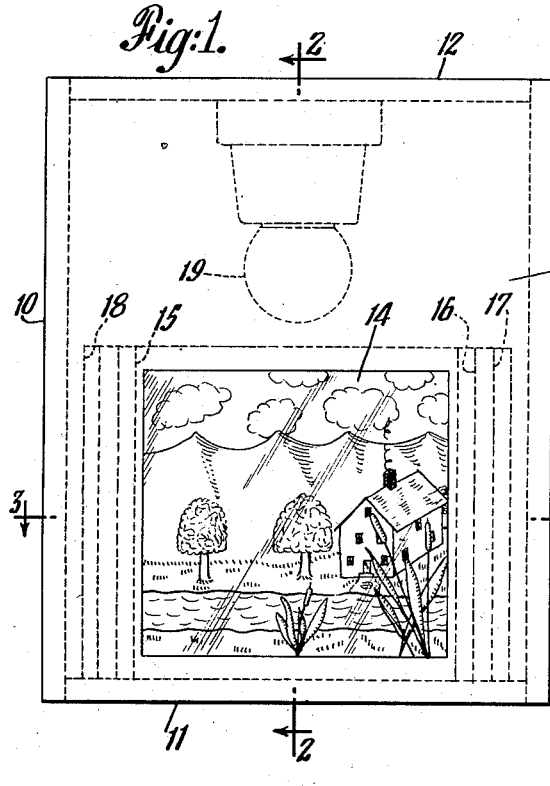
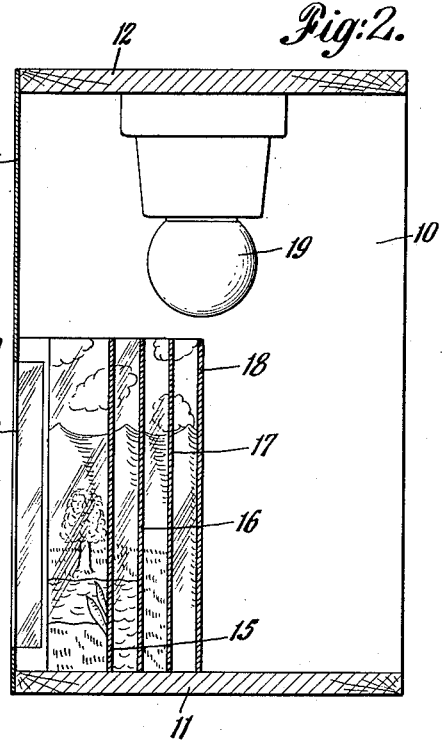
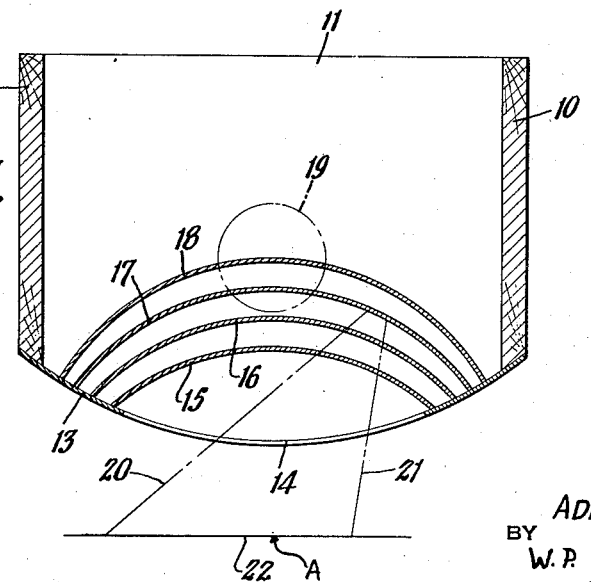
INVENTOR
ADRIAN L. FOLEY
BY W. P. CHURCHILL
ATTORNEY Aug. 28, 1951     A. L. FOLEY     2,565,553
THREE DIMENSION PICTURE DEVICE
Filed Nov. 10, 1948     3 Sheets-Sheet 2

INVENTOR
ADRIAN L. FOLEY
BY
W. P. CHURCHILL
ATTORNEY

Aug. 28, 1951     A. L. FOLEY     2,565,553
THREE DIMENSION PICTURE DEVICE
Filed Nov. 10, 1948     3 Sheets-Sheet 3
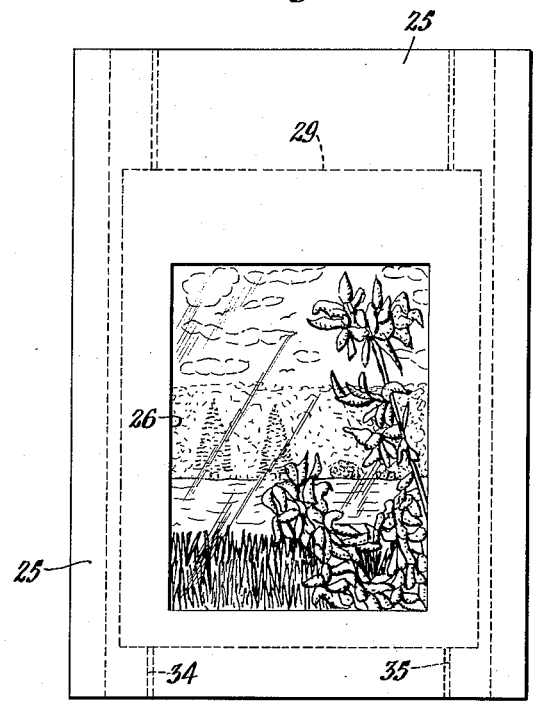
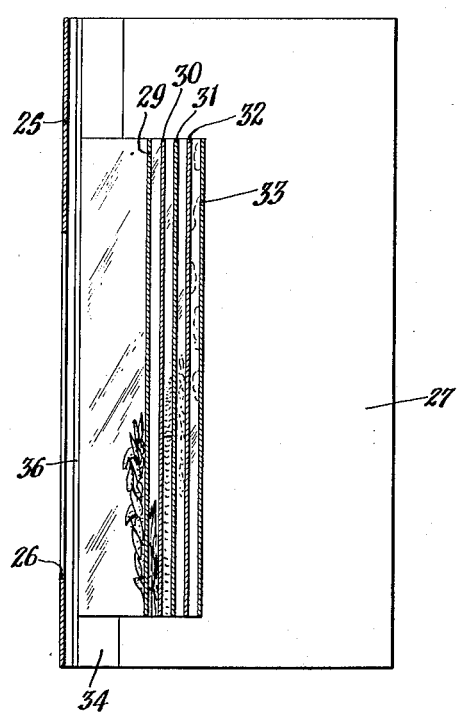
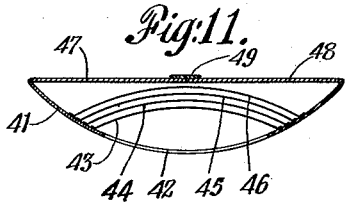
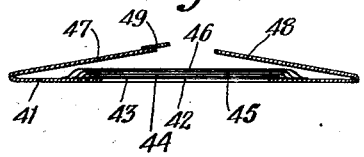
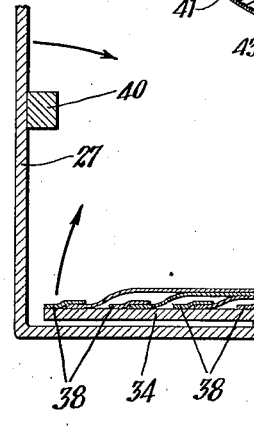
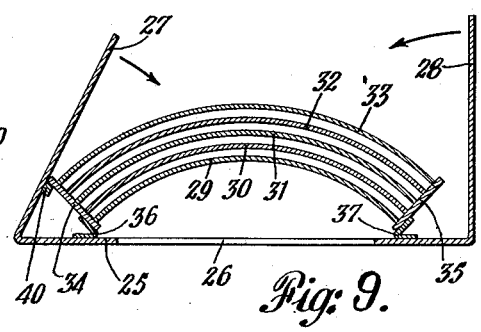
INVENTOR
ADRIAN L. FOLEY
BY
W. P. CHURCHILL
ATTORNEY Patented Aug. 28, 1951

2,565,553

UNITED STATES PATENT OFFICE 2,565,553

THREE DIMENSION PICTURE DEVICE

Adrian L. Foley, New York, N. Y.

Application November 10, 1948, Serial No. 59,399

5 Claims. (Cl. 41—21)

This application is a continuation-in-part of my copending application Serial No. 726,774 (now abandoned) filed February 6, 1947.

This invention relates to a three dimension picture device suitable for use in various types of advertising or other displays, and in various articles such as lamps and lamp shades.

Display devices have been suggested heretofore in which an attempt has been made to create the illusion of a three dimension picture or a true perspective by the use of flat parallel plates made of either transparent or opaque materials and carrying different portions of the picture. Such devices, however, have uniformly failed to achieve the appearance of a true or natural perspective, and, in addition, have the disadvantage of not being readily adaptable for use in articles such as lamp shades that are composed of curved or a combination of curved and flat surfaces. Furthermore, such devices conceal much of the margins of the picture which would be exposed to the normal angle of vision and always expose the side walls of any frame holding the plates when viewed from an acute angle.

One object of this invention is to provide a three dimension picture device which utilizes a relatively shallow actual depth but still depicts the various planes of distance in a natural manner and improves the illusion of a natural scene.

Another object of the invention is to provide a three dimension picture device in which the use of spaced sheets is not readily apparent from the appearance of the margins of the picture.

A further object is to provide a three dimension picture device utilizing curved transparent sheets one behind the other and bearing portions of a picture corresponding to their relative positions, thus producing the appearance of true perspective and a natural scene.

A still further object is to provide a three dimension picture device utilizing spaced curved sheets which can be easily folded to a flat position for shipping, packing or handling.

The foregoing and other objects and advantages of my invention will be more readily apparent from the following description of the embodiments of the invention illustrated in the accompanying drawings, in which Figure 1 is a front elevational view showing one form of my three dimensional picture device.

Figure 2 is a vertical section through this device taken about on the line 2—2 of Figure 1.

Figure 3 is a horizontal sectional view through this device taken about on the line 3—3 of Figure 1.

Figure 6 is a front elevational view of a different form of my device in which the picture sheets can be folded flat or opened into a curved position.

Figure 7 is a vertical section through approximately the center of the device illustrated in Fig. 6.

Figure 8 is a fragmentary horizontal section through the device illustrated in Figure 6 showing the details of construction.

Figure 9 is a horizontal section through the device illustrated in Fig. 6 showing the picture sheets opened out into the curved position.

Figure 10 is a horizontal sectional view, taken approximately through the center of a further modification of a folding device, and showing the device in relatively flat or collapsed position.

Figure 11 is a horizontal sectional view of the device in Fig. 10, but showing it in the open position for display of the picture.

Figure 4:
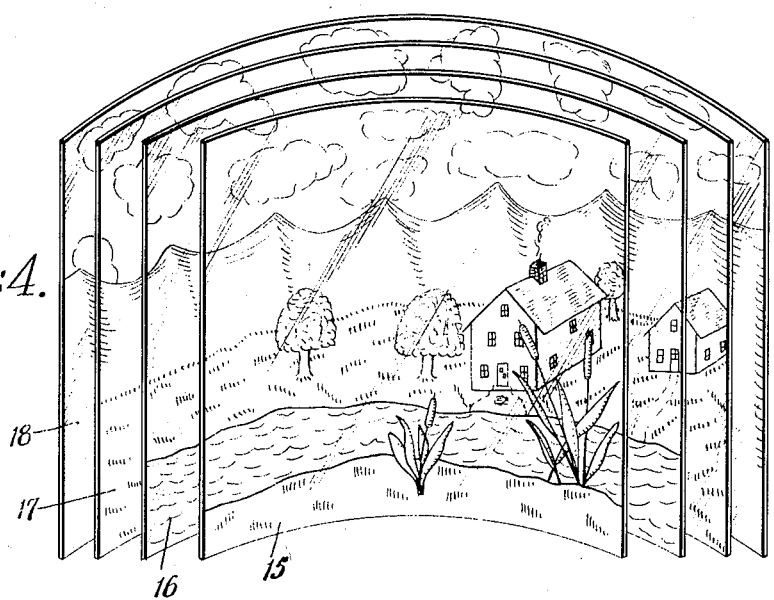
Figure 4 is a perspective view of the different curved transparent sheets used in the device of Figure 1 to provide the composite three dimension picture.

Referring particularly to Figs. 1 to 4, numeral 10 indicates the side walls of a frame or box having a suitable base 11 and top 12 to define an inset space for the curved sheets making up a three dimension picture. The front of the box or frame may be covered by a curved sheet of suitable material having a window or transparent section 14 located centrally with respect to the sheets making up the picture. The sheet containing the window 14 does not have to be curved however but may be flat or of any suitable configuration as long as it provides a window or aperture for viewing the picture.

The picture sheets themselves are preferably curved about relatively vertical axes located in front of the picture so that the sheets 15, 16, 17 and 18 are actually concave in shape as viewed from the front. The curvature of the sheets does not have to be circular but may be elliptical or some other form of curve. These sheets are preferably made of transparent material such as glass, clear plastic, or the like and are mounted in any suitable manner as by setting them in grooves in the base or by gluing or otherwise securing the sides of them in place. These sheets have printed, painted or otherwise reproduced on them different portions of a picture corresponding in each case to the relative position of the individual sheets. For example, the foremost sheet 15, as seen in Figure 4, has on its lower portion the immediate foreground, including the cat-o'-nine tails, and is transparent thereabove. Sheet 16 has on it the showing of the river which extends from a point above the foreground on sheet 15 down to or almost to the bottom of the sheet. Sheet 17 carries a picture of the bank or the land immediately beyond the river, including the trees and houses, and is transparent above this zone. The background sheet 18 has on it the picture of the mountains and sky. This background sheet does not have to be transparent but may be opaque or translucent depending on the scenic effect desired and the lighting arrangement used.

Preferably these sheets are each curved about one or more relatively vertical axes located in front of the picture so that they appear concave as viewed from the front of the picture. While it is not essential, I also prefer to use sheets that each have a slightly different radius of curvature, this radius being longer for the foreground sheet 15 and progressively shorter for the sheets 16, 17 and 18. This results in a somewhat greater spacing between sheets at their centers than is obtained near the side edges thereof. If desired, a suitable light fixture 19 may be mounted inside of the frame or box either near the top thereof or directly in back of the picture, or both as seems most appropriate. The composite picture is thus viewed from the front through the window section 14 of the front panel 13, the remainder of which is relatively opaque to screen from view the side edges, top and bottom of the sheets 15, 16, 17 and 18.

A picture constructed in this manner presents a very natural appearing panorama and illusion of perspective or distance. The use of sheets with different degrees of curvature accentuates the depth of the picture in the center and, if desired, this may be compensated for by the size and color of objects reproduced nearer the margins of the curved sheets. On the other hand this compensation is not needed if the sheets are disposed concentrically.

A particular advantage of the use of curved sheets instead of flat sheets or plates is that the side walls of the frame holding the sheets constituting the composite picture are entirely concealed from view regardless of whether the observer is looking at the picture from directly in front of it, or looking at it from a considerable angle. A person walking past such a picture also sees a much more natural panorama and does not see the margins of the picture from any position. Furthermore, the use of curved sheets changes entirely the manner in which an object on one of the foreground sheets conceals objects on the background sheets and the angles at which the picture must be viewed before the object on the background sheet is uncovered and brought into view. This is again a closer approach to the natural scene.

For example, referring to Figure 3, it may be assumed that the area on sheet 16 between the dot-dash lines 20 and 21, conceals the area on the sheet 17 between these lines. An observer walking along the line 22 does not see this area on the sheet 17 until he passes either the line 20 or the line 21. Expressed in another way, if an object on the background sheet 17 located near the margin of the picture, is concealed from the view of an observer standing at the point A on line 22 by an object on the foreground sheet 15, the figure on the background sheet is exposed much more quickly if the observer moves to the right along line 22 than if he moves in the opposite direction along line 22. This difference in the angles at which objects on background sheets or plates are exposed to the view of the observer moving along line 22, is progressively reduced to the extent the objects on the background and foreground sheets or plates are centrally located. These differences in the angles of exposure incident to viewing various portions of the picture from various angles simulates the exposure which occurs in viewing a natural scene, thereby particularly enhancing the illusion of depth in the center of the picture.

A further advantage of the use of these curved transparent sheets is that they are particularly adaptable for mounting in inset spaces and particularly spaces bounded by curved or flat surfaces that are open or viewed from one or more directions. In the application of my invention to a lamp shade, the back sheet may be made opaque or translucent, or a reflector substance may be applied to the back of the sheet.

Figure 5:
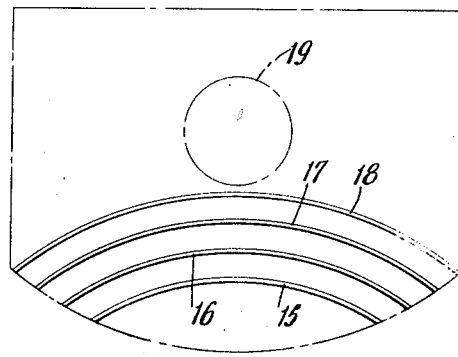
Figure 5 is a somewhat diagrammatic plan view showing a modification in which the curved sheets are concentric and evenly spaced.

Under certain circumstances, it may be desirable to use a series of curved sheets such as shown in Figure 5, all of which have the same degree of curvature and which are mounted in such a manner as to be concentric.

A modification of my picture device is shown in Figs. 6 to 9 in which the curved picture sheets are mounted in such a way that they may be either folded flat to facilitate shipping, packing or handling of the device, or opened out so that the sheets are in curved form for proper display of the picture. The frame of the picture may include a front panel 25 which may be made of suitable material such as cardboard, wood, metal, plastics or the like, and is provided with an opening or window 26 to frame the picture shown on the curved picture sheets. Attached to the side edges of the front panel 25 are two side panels 27 and 28 which are preferably arranged so that they can be folded against the back of the front panel 25.

In order to permit folding of the picture sheets, these sheets 29, 30, 31, 32 and 33 are preferably secured at their side margins to the hinge pieces 34 and 35. Although five curved picture sheets have been illustrated in this form of the device, it will be apparent to those skilled in the art that any suitable number of such sheets may be used. The hinge pieces 34 and 35 may be made of any suitable material such as cardboard, plastics, metal, etc., and may be hinged along their inner side edges to the inner surface of the front panel by the use of adhesive tapes, or other suitable hinges 36 and 37. Thus, the hinge pieces 34 and 35 may be folded flat against the inner surface of the front panel 25 as seen in Fig. 8, or opened out to extend at a suitable angle to the front panel as seen in Fig. 9.

The picture sheets 29 to 33, which may depict a three dimension scene as previously described in connection with Figs. 1 to 5, are attached at their side edges to the respective hinge pieces 34 and 35. For this purpose, the edges of the picture sheets, if made of thin flexible material, may be simply folded and secured by staples, adhesive or the like directly to the surface of the hinge pieces. Alternatively separate adhesive tapes or other hinge numbers such as illustrated at 38 (Fig. 8) may be used for this purpose.

I have found that when both side edges of the picture sheets are connected to hinge pieces, as shown in Figs. 8 and 9, the picture sheets should be arranged so that they curve about a single axis with each sheet having a slightly different radius of curvature. Otherwise, the device will not fold flat against the back of front panel 25. However, the sheets do not have to be equally spaced from each other in the curved position, and if desired the picture sheets may be detachably secured to one of the hinge pieces in which event they can be curved about different axes and still be folded flat.

The picture sheets usually have a certain amount of springiness or tendency to return from the curved position of Fig. 9 to the flat position of Fig. 8. Consequently, it may be desirable to use some means for holding the picture sheets in the curved position when the picture is to be displayed. For this purpose, the side panels may be provided along their inner surfaces with suitable ribs such as shown at 40 which are capable of engaging and holding the free edges of the hinge pieces 34 and 35 when the device is opened to display the picture.

While the hinge pieces 34 and 35 may be hinged to the front panel closely adjacent the margins of the opening 26, they are preferably hinged along lines set back some distance from the edges of this opening so that when the sheets are arranged in curved form, the side edges of the sheets are concealed behind the front panel 25. It will also be apparent that the curved picture sheets should be made of appropriate lengths depending upon the degree of curvature desired when they are opened into the picture displaying position. In general, it is desirable to arrange them so that the hinge pieces 34 and 35 are opened only at an acute angle to the front panel 25.

Figs. 10 and 11 illustrate a further modification of my picture device which, like the device shown in Figs. 6 to 9, may be folded flat or opened into picture displaying position, but which does away with the hinge pieces 34 and 35. In this further modification, the front panel 41, which has a central opening or transparent section 42, is made of flexible sheet material so that it may be flattened into the shape shown in Fig. 10, or bent into the curved picture display position of Fig. 11. Thus, the picture sheets 43, 44, 45 and 46 may be hinged directly along their side edges to the inner surface of front panel 41 on either side of the window 42.

Back flaps 47 and 48 may be used to hold the device in the open or curved position by securing their free edges together with a tape 49 or other suitable fastening means. In this case it is only necessary to remove or disengage the tape 49 or other fastening in order to collapse the device into the flat position. If desired, of course, the flaps 47 and 48 may be omitted and any suitable form of tensioning means used to hold the front panel 41 in the curved picture display position of Fig. 11.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A three dimension picture device which comprises a frame having an opening for viewing a picture, a plurality of curved substantially concentric transparent sheets held in position to be viewed through said opening, the sheets being at different distances from said opening with their concave surfaces facing the opening and arranged with different portions of a picture appearing on each sheet so that the composite of the sheets depicts a complete picture in three dimensions, the side edges of each successive sheet extending further to the side than the side edges of the sheet immediately in front of it.

2. A three dimension picture device which comprises a frame having an opening for viewing a picture, a plurality of sheets of transparent material curved about substantially vertical axes and held in position to be viewed through said opening, the sheets being at different distances from said opening with their concave surfaces facing the opening and arranged with different portions of a picture appearing on each sheet so that the composite of the sheets depicts a complete picture in three dimensions, the side edges of the sheets being spaced from each other and each such side edge extending further to the side than the edge of the sheet in front of it.

3. A device as defined in claim 2 in which the sheets of transparent material are flexible and flexibly attached at their side edges to the frame so that the device may be flattened into a compact form for transportation.

4. A device as defined in claim 2 in which the sheets of transparent material are flexible and attached to hinge members pivotally attached to the frame so that the device may be flattened into a compact form for transportation.

5. A collapsible three dimension picture device which comprises a frame member made of flexible material and having an opening therein, a plurality of flexible sheets of transparent material having their side edges flexibly attached to said member on each side of said opening, and tension means connecting the sides of said frame member together to hold the same in curved position, said transparent sheets being attached to the member at spaced points so that when said member is held in curved position, said sheets are curved about vertical axes with their concave surfaces facing the opening and spaced different distances from the opening in position to be viewed therethrough, said sheets having different portions of a picture appearing on each sheet so that the composite of the sheets depicts a complete picture in three dimensions when viewed through the opening.

ADRIAN L. FOLEY.

REFERENCES CITED

The following references are of record in the file of this patent:

UNITED STATES PATENTS

| Number | Name | Date |
|---|---|---|
| 678,012 | Maratta | July 7, 1901 |
| 956,916 | Wiederseim | May 3, 1910 |
| 1,728,166 | Horton | Sept. 10, 1929 |